May 26, 1959
R. R. KELLER
2,888,112
PANEL JOINTS AND PANEL JOINING DEVICES
Filed April 13, 1956
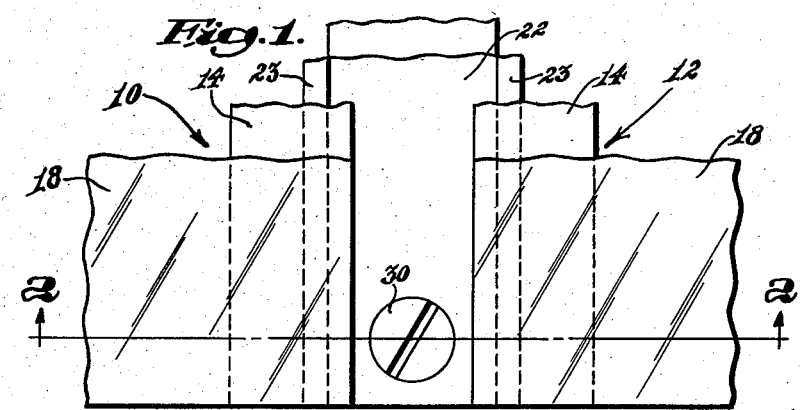
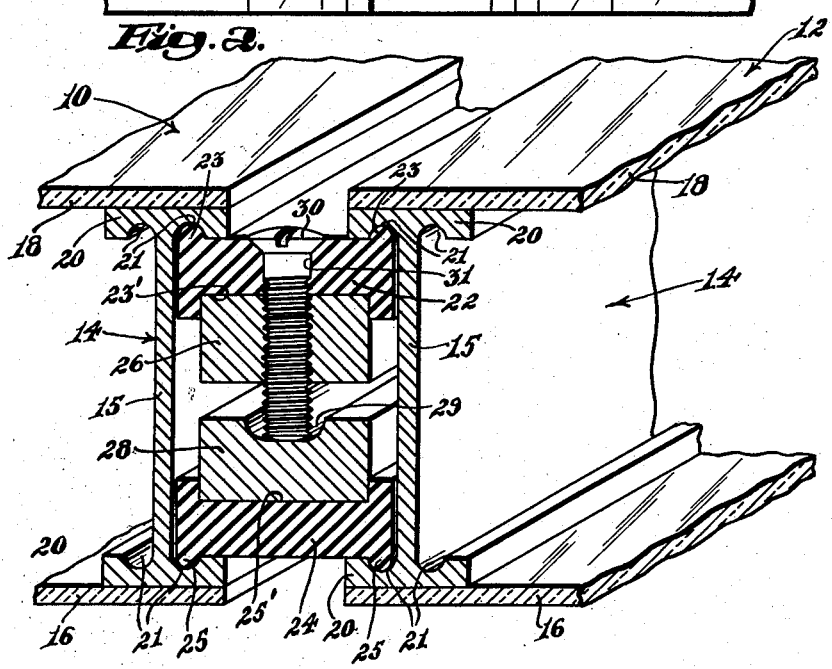
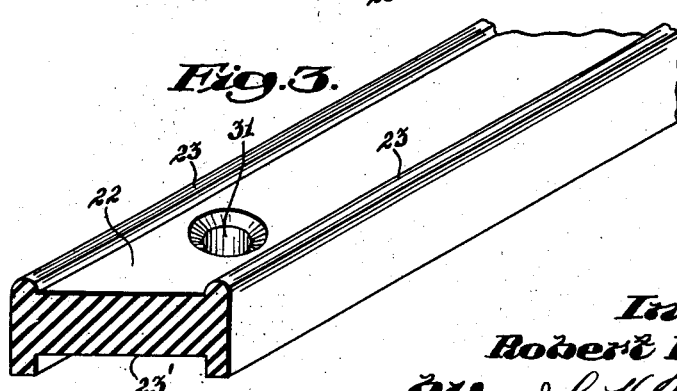
Inventor:
Robert R. Keller,
by John H. McKenna
Attorney

United States Patent Office

2,888,112

PANEL JOINTS AND PANEL JOINING DEVICES

Robert R. Keller, Manchester, N.H.

Application April 13, 1956, Serial No. 578,049

4 Claims. (Cl. 189—36)

This invention relates to improvements in panel joints and panel joining devices. More particularly, the invention provides improvements in panel joints and panel joining devices of the general variety disclosed in my co-pending application Serial No. 538,359, filed October 4, 1955 wherein the panels which are to be joined have generally cross-sectionally I-shaped frame elements of which adjacent frame elements of adjacent panels may be relatively quickly secured together by spreadable clamping members which lock the adjoining panels together. My present invention improves upon the spreadable clamping means in such panel joints and panel joining devices whereby a panel joint provides for expansion and contraction at the joint which may be from two to four, or more, times as large as is permissible with the clamping means of my said co-pending application.

Hence, it is among the objects of my present invention to provide a panel joint which provides for substantial expansion and contraction between adjacent joined-together panels substantially uniformly throughout the extent of any particular joint.

Another object of the persent invention is to provide a panel joint wherein clamping means extends along and between adjacent edges of panels which are to be joined together, and wherein resilient clamping elements lock the panels together and simultaneously seal the joint while permitting substantial relative movements of the joined panels in response to temperature changes which may cause expansion or contraction of the panels.

Yet another object of my present invention is to provide a panel joining means wherein a pair of relatively long elements of resilient material are pre-formed for inter-locking engagement with two adjacent panels along parallel edges of the panels, and for coaction with a pair of similarly long relatively rigid elements which are operable between the panels and between said elements of resilient material to effect and maintain said inter-locking engagement of the latter said elements with the panels while simultaneously sealing the panel joint against entrance of moisture.

It is, moreover, my purpose and object generally to improve the structure and effectiveness of panel joints and especially such joints between panels having cross-sectionally relatively I-shaped frame elements extending along edges of each panel, between opposite panel-facing members.

In the accompanying drawing:

Fig. 1 is a plan view of fragments of two panels joined together along adjacent edges by means embodying features of the invention;

Fig. 2 is a fragmentary perspective view, with portions in cross-section on line 2—2 of Fig. 1; and Fig. 3 is an isometric view of a fragment of the upper one of the pre-formed panel- engaging members of Fig. 2.

Referring to the drawing, two panels are indicated generally at 10 and 12 with adjacent edges thereof disposed in spaced parallelism. Each panel is shown as having a rigid frame element 14 extending along its edge, with panel-facing members 16, 18 secured to the opposite edge portions of the frame elements. The opposite edge portions of each frame element 14 has a flange 20 thereon extending to opposite sides of a central web 15, and each flange 20 is channeled at 21, at each side of the adjacent web 15, with the channels of one flange 20 opposite and open toward the similar channels in the other flange of the same frame element 14.

Inter-locking joinder of the adjacent panels 10, 12 may be effected by spreadable clamping strips disposed between and extending along adjacent edges of the panels.

According to the present invention, each panel-joining means comprises a pair of panel-engaging strips 22—24 pre-formed of resilient material to have substantially the cross-sectional shape as shown in Figs. 2 and 3, although it may be assumed that the strips 22, 24, in Fig. 2, have been compressed and deformed somewhat in the clamping process.

Strip 22 has the parallel longitudinal beads or ribs 23 extending along the edges of one side of the strip for engaging, each in one channel 21 in a frame element 14 of a different one of the two panels. The other side of strip 22 is centrally grooved at 23', from end to end of the strip, for reception therein of the relatively rigid strip 26, which may be of extruded aluminum, or of any other suitable material.

Strip 24 is generally similar to strip 22, with the beads or ribs 25 extending along opposite edges at one side, and with groove 25' extending centrally from end to end of the strip at the other side, the said groove 25' receiving therein the relatively rigid strip 28 which may be of material as specified for strip 26. Strip 28, however, preferably is grooved at 29 along one side for reception therein of the ends of a suitable number of spaced clamping screws 30 (only one being shown), which extend through pre-formed holes 31 in resilient strip 22 and are threaded through rigid strip 26 with their inner ends engaging rigid strip 28 within the groove 29. Tightening of screws 30 effects spreading apart of the rigid strips 26, 28 and resulting appreciable compression of the pre-formed resilient strips 22, 24, whereby the latter said strips constitute longitudinal sealing gaskets as well as effecting an effective inter-lock between the adjacent panels 10, 12. Also, they introduce a desirable substantial amount of resilience in each panel joint, from end to end thereof, whereby expansion and contraction of the panels is accommodated while maintaining the effectiveness of the clamp and of the sealing characteristics thereof.

It has been found that the resilient strips 22, 24 conveniently and advantageously may be extrusions of neoprene having substantially the cross-sectional shapes shown in the drawing, the clamping pressure produced in the tightened clamp, as in Fig. 2, causing only relatively little distortion of the pre-formed strips yet subjecting the strips 22, 24 to sufficient compression to effectively seal the joint against entrance of moisture past the gasket strips 22, 24. Obviously, rubber substitutes and rubber compositions, and comparable relatively resilient materials having suitable toughness and strength, may be used for the gasket strips 22, 24. However, the gasket strip material should provide for appreciable relative movement of the panels 10, 12, in response to temperature changes without any loosening of the clamp or breaking of the seal. Actually, should inequalities of temperature produce inequalities of expansion, the rigid strips 26, 28 can tilt relatively to satisfy particular expansion or contraction conditions without unduly straining the panel joint elements.

It is intended that the patent shall cover, by suitable expression in the appended claims, whatever features of patentable novelty exist in the invention disclosed.

I claim as my invention:

1. A panel joint comprising a pair of rigid frame elements each extending along an edge of different ones of two panels which are to be joined together, each said frame element having portions disposed in opposite spaced relation and each said portion having a longitudinal groove therein open toward the similar groove in the opposite said portion of the same frame element, a pair of stripform members between said frame elements of said two panels maintaining said frame elements in spaced relation, said stripform members being spaced substantially apart in directions transversely of the general directions of extent of the said frame elements, and said stripform members being made of relatively resilient material, each said member extending between said frame elements of the two panels at the respective locations of the members, and each having a pair of pre-formed longitudinal ribs thereon engaging, one in a said groove in a said portion of one frame element and the other in a said groove in a said portion of the other frame element, a pair of rigid members spaced apart between said resilient stripform members and extending along substantial portions of the lengths of the latter said members, and manually operable means operable through the space between said frame element spreading apart said rigid members into compressing engagement with said resilient strip-form members thereby to simultaneously lock the panels together and effectively seal the joint against passage of moisture into the joint.

2. A panel joint comprising a pair of rigid frame elements each extending along an edge of different ones of two panels which are to be joined together, each said frame element having portions disposed in opposite spaced relation and each said portion having a longitudinal groove therein open toward the similar groove in the opposite said portion of the same frame element, a pair of relatively long members of resiliently compressible material disposed between said frame elements and maintaining said elements in spaced relation, said members being spaced substantially apart in directions transversely of the general directions of extent of said frame elements, and said members bridging the space between the frame elements in spaced generally parallel planes, each said member of compressible material having longitudinal ribs thereon engaging one in a said groove of one frame element and one in a said groove of the other frame element, spaced longitudinal rigid members between said members of compressible material, one of said rigid members engaging one of said compressible members and another of said rigid members engaging the other of said compressible members, and manually operable means operable through the space between said frame elements spreading said rigid members apart into compressing relation to said compressible members thereby to clamp said panels together with said compressible members yieldable in response to contraction and expansion of the panels while maintaining a tight seal against entrance of moisture past said compressible members.

3. A panel joint clamp comprising a pair of relatively long generally rectangular members pre-formed of resiliently compressible material and each having a pair of spaced generally parallel ribs extending from end to end of the member at one side thereof, and each having a longitudinal groove in the opposite side thereof, a pair of relatively long generally rectangular rigid members disposed between said members of compressible material, each being seated in a said groove in different ones of said members of compressible material, threaded means extending through one of said members of compressible material and through the adjacent one of said rigid members, and being threadedly engaged with the later said member, said members of compressible material being adapted to engage between flanged frame elements of two panels with said ribs inter-fitting with portions of the two panels and maintaining a predetermined spaced parallelism of adjacent edges of the panels, and said threaded means being operable through the space between the panels for compressing said members of compressible material into sealing relation to said frame elements of the panels, said compressed members permitting substantial relative movements of the panels in response to expansion and contraction thereof.

4. A panel joining clamp comprising a pair of relatively long extruded neoprene gasket members, each having a pair of generally parallel spaced ribs extending in parallelism along one side thereof and having a longitudinal groove extending along the opposite side thereof, said gasket members being adapted to be disposed between frame elements of two adjacent panels for maintaining adjacent edges of the two panels in spaced relation and to engage back of flange portions of said elements and to extend throughout the length of said adjacent edges of the two panels, a pair of relatively long rigid members disposed longitudinally between said gasket members and seated in said grooves of the gasket members, and manually operable means accessible between said adjacent edges of the panels for spreading said rigid members apart thereby to compress said gasket members between said rigid members and said flange portions of the panel frame elements, said gasket members effectively sealing the panel joint while permitting substantial relative movements of the panels in response to expansion and contraction thereof.

References Cited in the file of this patent

UNITED STATES PATENTS

| | | |
|---|---|---|
| 1,437,266 | Palmer-Jones | Nov. 28, 1922 |
| 2,290,430 | Heiser | July 21, 1942 |
| 2,362,162 | Sheldon | Nov. 7, 1944 |

FOREIGN PATENTS

| | | |
|---|---|---|
| 123,940 | Sweden | Feb. 1, 1949 |
| 74,872 | Norway | Apr. 4, 1949 |